Aug. 20, 1957 M. CAMRAS 2,803,708
ELECTROMAGNETIC TRANSDUCER HEAD
Filed Sept. 26, 1951 3 Sheets-Sheet 1

Inventor
Marvin Camras
by Hill, Sherman, Meroni, Gross & Simpson Attys

Inventor:
Marvin Camras
by Hill, Sherman, Meroni, Gross & Simpson Attys

Inventor:
Marvin Camras by Hill, Sherman, Meroni, Gross & Simpson Attys 2,803,708

ELECTROMAGNETIC TRANSDUCER HEAD

Marvin Camras, Chicago, Ill., assignor to Armour Research Foundation of Illinois Institute of Technology, Chicago, Ill., a corporation of Illinois Application September 26, 1951, Serial No. 248,360

40 Claims. (Cl. 179—100.2)

This invention relates to an electromagnetic transducer head and to a method of magnetic recording, and more particularly, to a head for magnetic recording and reproducing apparatus which employs a method and means for altering the shape and characteristics of a high frequency bias field and/or shape and characteristics of an intelligence signal field in the region of the record gap.

In one type of magnetic recording apparatus, a lengthy magnetizable record medium is drawn across an electromagnetic transducer head assembly at substantially uniform linear velocity. The head assembly includes a magnetic core member having a non-magnetic gap over which the medium passes and which is provided with suitable current-conducting exciting elements to produce a magnetic field across the gap. The pole portions of the core member which form the non-magnetic gap are so positioned and arranged that the medium passes over first one pole and then across the gap and then over the other pole.

During the recording operation, current is caused to flow in the exciting elements in accordance with time variations of an intelligence to produce a time-varying magnetic field in the core and in accordance with the value thereof. The lengthy magnetizable medium is subjected to the influence of this field as it is drawn therethrough, and magnetization is imparted to incremental lengths of the medium in accordance with the time variations of the intelligence, thus causing variations in the magnetization of the medium along its length in accordance with the time variations of the intelligence.

During reproduction, the lengthy magnetizable medium is drawn across the same or similar head assembly to set up a flux in the core portion thereof in accordance with the magnetization of the medium along successive incremental lengths as it passes across the gap of the magnetic core member. The resultant time-varying flux induces a voltage in the coil with which the flux is linked in accordance with the time rate of change thereof. This voltage may be amplified and suitably reproduced by a loud speaker or similar device to produce the intelligence recorded.

This magnetic recording and reproducing device inherently involves the conversion of an intelligence to a time-varying magnetic field during the recording operation, and the conversion of a time-varying magnetic flux into an intelligence in the reproducing operation.

It has been found in practice that one of the limitations on how high a frequency you can record and how well you can record any frequency depends to a considerable degree on how rapidly the magnetic intensity of the high frequency bias field and/or intelligence signal field decays at the trailing pole of the electromagnetic transducer head after the record medium has crossed the gap.

In my copending application entitled "Electro-magnetic Transducer Head," U. S. Serial No. 137,001, filed January 5, 1950, now Patent No. 2,628,285, issued February 10, 1953, of which the present application is a continuation-in-part, I have described one method and means for altering the normal shape and characteristics of the magnetic field in the region of the record gap to obtain a much more rapidly decreasing magnetic intensity of an intelligence signal field and/or a high frequency bias field at the trailing pole, thereby improving the recording ability of the head. In this copending application, the electromagnetic transducer head involves the use of an extra pole to effect an alteration of the shape and characteristics of the magnetic field in the region of the recording gap. This extra pole in my copending application is located on the opposite side of the traveling record member from the main magnetizing poles. While greatly improved results are obtained with this type of head construction, it has been found in practice that the presence of this additional pole on the opposite side of the record medium from the main recording poles has been of some disadvantage in the ease of threading the record member into the head assembly and of the general handling of the magnetic recording and reproducing apparatus. It has also been somewhat costly to manufacture such a head.

The present invention obtains the same or better results for intelligence signal fields and/or bias fields than the head construction described in my aforesaid copending application, but eliminates the need for the extra pole on the opposite side of the record member from the main pole pieces.

One of the principal features and objects of the present invention is to provide a novel electromagnetic transducer head assembly all of which lies on one side only of the record member traveling over the head.

A further object of the invention is to provide a novel method and means for magnetically recording intelligence on a magnetizable record member.

A still further object of the present invention is to provide a novel electromagnetic transducer assembly.

Another and still further object of the invention is to provide a novel method and means for magnetic recording in which a very rapidly decaying magnetic intensity of the magnetizing field appears in the region of the trailing pole of the head assembly.

Another and still further object of the invention is to provide a novel method and means for changing the normal field configuration of the bias field in the region of the record gap of an electromagnetic transducer head.

Still another and further object of the invention is to provide a novel electromagnetic transducer head which is so constructed and arranged that a bias field is set up in the region of the record gap which lies generally perpendicular to one pole and generally parallel to the other pole lying on opposite sides of the record gap.

Yet another and further object of the invention is to provide a head which produces a magnetic field at the recording gap which is more uniform throughout the thickness of the magnetizable layer.

Yet another and still further object of the invention is to provide a head wherein optimum bias is practically the same for high as for low audio frequencies.

A further object of the invention is to provide a novel electromagnetic transducer assembly which has improved reproduction or play-back qualities.

A still further object of the invention is to provide a method for altering a field in the recording region of a head which comprises imposing on a main concentrated field having a curved configuration in the region, a second field of curved configuration for producing a better cancellation between the fields.

Another and still further object of the invention is to provide a novel method and means for magnetic recording wherein a second field is utilized to provide a null point near the recording region when combined with the main recording field.

Still another and further object of the present invention is to provide a novel method and means for magnetic recording wherein a second field is imposed on the main recording field, the second field progressively diminishing in intensity beyond the recording region.

Yet another and further object of the invention is to provide a novel electromagnetic transducer head and method for use in either transverse or longitudinal magnetic recording.

A more specific object of the present invention is to provide an electromagnetic transducer head made from a single core blank, all of which lies in a single plane, and all of which lies on one side only of the record member traveling over the head, which is adapted to produce a substantial alteration of the recording field as compared with the conventional head of this type.

Another more specific object of the invention is to provide a magnetic field at the trailing pole which is more uniform in the lateral direction across the magnetizable medium passing thereover.

A further more specific object of the present invention is to provide a novel electromagnetic transducer head in which the erase gap is placed so close to the record gap that some of the erase field acts directly on the record medium in the region of the record gap, but substantially at right angles to the direction of travel of the record medium.

A still further more specific object of the present invention is to provide a novel electromagnetic transducer head having an erase gap and a record gap therein so positioned with respect to each other that some of the flux of the erase gap influences the record member in the region of the record gap, but which flux is substantially at right angles to the flux of the bias field of the record gap, and which flux approximates the magnitude of the bias flux.

Another and still further more specific object of the present invention is to provide a novel method and means for allowing closer spacing of an erase gap and a record gap while yet giving adequate flux carrying capacity.

Still another and further more specific object of the present invention is to provide a novel electromagnetic transducer head assembly which employs one or more auxiliary poles all of which lie on the same side of the record member as the remainder of the head assembly.

Other objects and features which I believe to be characteristic of my invention are set forth with particularity in the appended claims. My invention itself, however, both as to its organization, manner of construction, and method of operation, together with further advantages and objects thereof, may best be understood by reference to the following description taken in connection with the accompanying drawings, in which:

Figure 1:
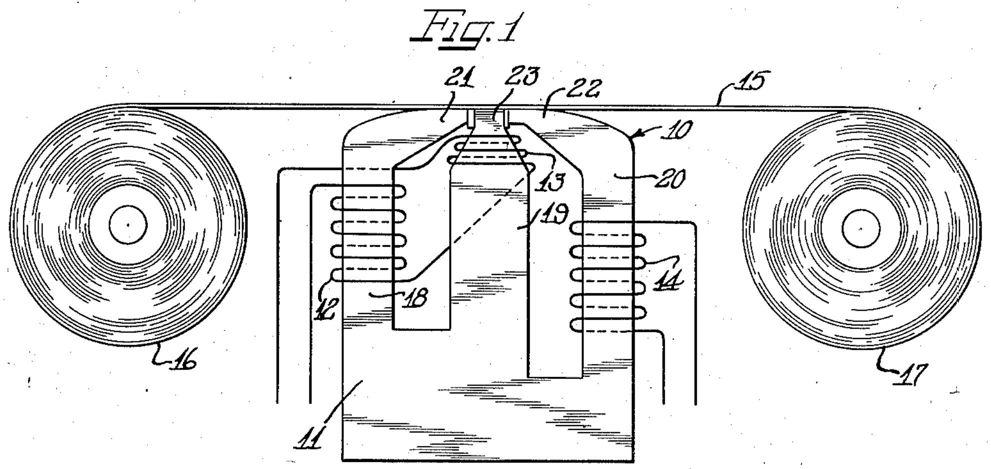
Figure 1 is a diagrammatic view of an electromagnetic transducer head embodying the novel teachings and principles of the present invention.

The first embodiment of the present invention is illustrated in Figure 1 of the drawing and includes an electromagnetic transducer head 10 having a core 11, an erase coil 12, a bias coil 13, and a signal or voice coil 14. The core 11 is made of any suitable high permeability material having low magnetic retentivity. The magnetic record member 15, such, for example, as a wire or tape, is arranged to be drawn across the head 10, the record member 15 being supplied from a supply spool 16 and wound up on a take-up or drive spool 17.

The core 11 of the electromagnetic transducer head 10 includes three upstanding legs 18, 19 and 20. The outer legs 18 and 20 are generally in the shape of an inverted L and have upper pole portions or pole members 21 and 22 which extend toward the reduced center portion 23 which forms the tip of the upstanding center leg 19. Since the normal direction of travel of the record member 15 is from left to right, as viewed in Figure 1 of the drawing, it is apparent that the gap 24 which lies between the pole member 21 and the pole tip 23 is the erase gap, while the gap 25 which lies between the pole tip 23 and the pole member 22 is the record gap.

One of the principal features of the present invention is to so control the relative spacing between the gaps 24 and 25 with respect to the gaps 24 and 25 themselves as to produce a substantial alteration in the actual shape of the bias field in the region of the record gap 25. By the way of example, and not by way of limitation, the erase gap for a tape record member may be .003″, the record gap may be .0003″, and the space between the gaps may be .015″.

It will be observed that the erase coil 12 is in series with the bias coil 13, and that the two coils are wound in such a direction as to be in aiding flux relation in their magnetic path which includes the left leg 18 and the center leg 19.

It will also be observed that the flux of the bias field also passes around a magnetic circuit which includes the center leg 19 and the right leg 20, which is the same magnetic circuit as the principal magnetic circuit for the voice or signal coil 14.

As is well known to those skilled in the art, the bias field produced by the coil 13 is thus superimposed on the flux of the voice coil 14 in the region of the record gap 25. Because of the very close proximity of the erase gap 24 to the record gap 25, it will be noted that there is a semicircular field set up by the erase flux which extends clear over into the region of the record gap. Since this flux is of the same frequency as the flux set up by the bias coil 13, it will obviously affect the bias field in the region of the record gap. The long broken lines shown in Figure 2 and indicated by the letter A represent the flux being set up by the erase coil 12 in the region of the record gap 25. This, of course, is in addition to the very highly concentrated erase field which lies immediately between the pole tip 21 and the pole tip 23. The dotted lines B are the magnetic field which tends to be set up by the bias coil 13 in the region of the record gap 25.

Figures 2, 3:
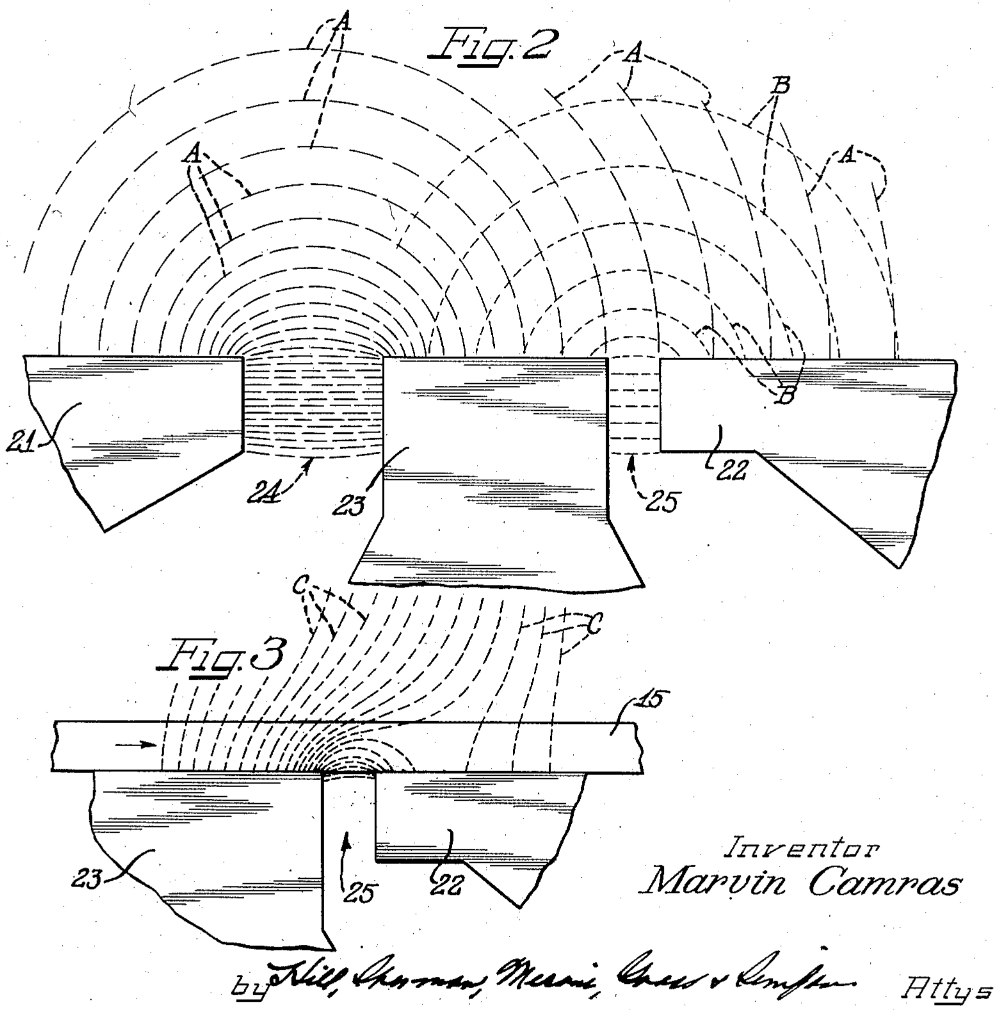
Figure 2 is a fragmentary, greatly enlarged, front elevational view of the pole tips of the electromagnetic transducer head shown in Figure 1, with an indication of where the erase field and the bias would lie if they were not combined.
Figure 3 is a view similar to Figure 2 showing the actual resultant bias field which is obtained in part from the leakage flux of the erase gap and in part from the bias flux of the record gap, the resultant field being the actual bias field effective in the recording process.

It will be observed that the flux of the magnetic field A as it tends to be set up by the erase coil 12 in the region of the record gap 25 lies substantially perpendicular to the direction of travel of the record member 15, while the flux path of the bias field B as it tends to be set up in the region of the record gap 25 tends to be somewhat semicircular in configuration. Since these two magnetic fields are superimposed on each other and are of the same frequency, a resultant magnetic field is obtained which has a shape as indicated by the lines C as shown in Figure 3. Since the lines of equal magnetic potential lie at right angles to the flux lines shown in the various figures of the drawing, it will be readily understood by those skilled in the art that a very rapidly decaying magnetic field occurs in the region of the trailing pole 22 of the record head assembly.

It will furthermore be observed from an inspection of Figure 3 that the flux lines of the resulting bias field extend generally at right angles to the magnetic record member 15 in the region of the leading pole, but lie substantially parallel thereto in the region of the trailing pole 22. Thus, a much more nearly true longitudinal field is obtained than is the case with the conventional electromagnetic transducer heads of the present time which produce so-called longitudinal magnetic recording.

It will also be observed that by reversing the polarity of the bias coil 13 with respect to the erase coil 12, transverse biasing fields may be obtained rather than a longitudinal bias field, since in such event, the vertical portion of the bias field flux will then be in the region of the trailing pole piece and the longitudinal portion will be in the region of the leading pole piece.

From the above description, it will be understood that the highly desirable features of the present invention may be obtained by controlling the relative spacing between the erase and record gaps with respect to the relative number of coil turns of the erase winding and the bias winding so as to cause the two fields which tend to be produced by each in the region of the record gap to be of approximately the same magnitude and to be approximately at right angles to each other. When so proportioned, the resultant biasing field, produced in part by the bias coil and in part by the erase coil, has a configuration which is substantially at right angles to the direction of travel of the record member in the region of one pole and substantially parallel thereto in the region of the other pole. Under such circumstances, greatly improved magnetic recording is obtained. This is particularly true with respect to the recording of higher frequencies.

Figure 4:
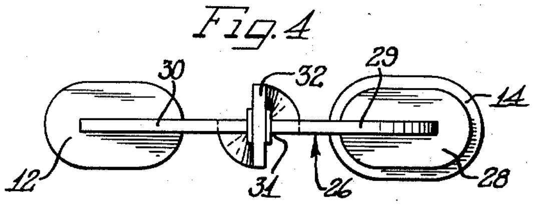
Figure 4 is a top plan view of a modified electromagnetic transducer head assembly embodying the novel teachings and principles of the present invention.
Figure 5:
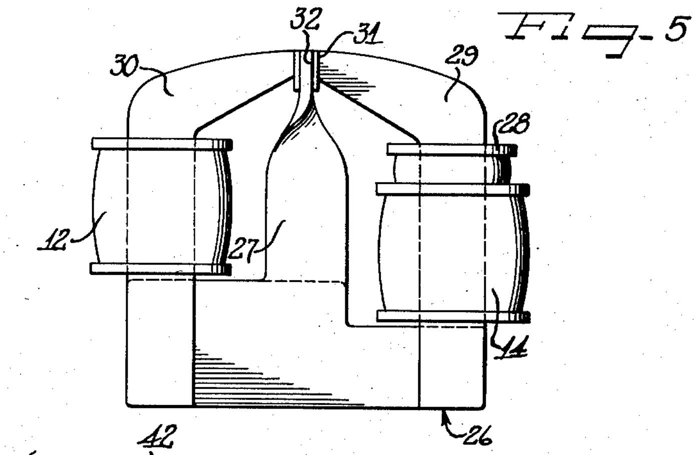
Figure 5 is a front elevational view of the head assembly of Figure 4.
Figure 5A:
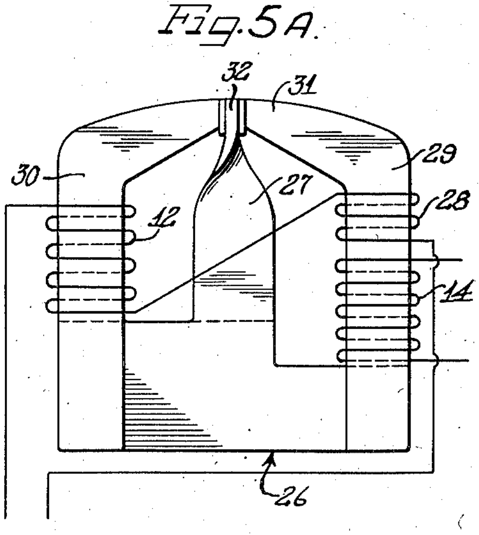
Figure 5A is a diagrammatic illustration of one arrangement of the windings of the bias coil relative to the erase coil of the head assembly of Figure 5.
Figure 5B:
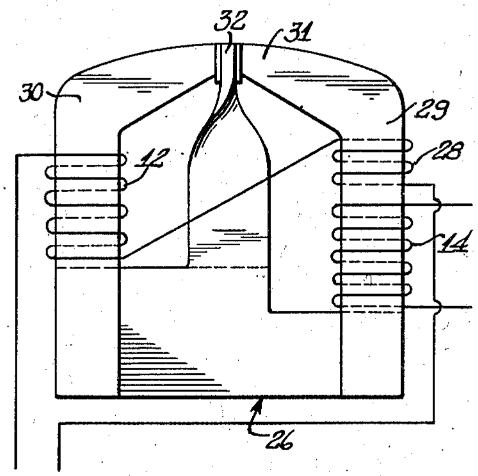
Figure 5B illustrates diagrammatically another arrangement of the windings of the bias coil relative to the erase coil.

In Figures 4 and 5 of the drawings, a modified form of head construction is shown in which the head 26 has a twisted center lamination indicated by the reference numeral 27 to allow close spacing of the gaps and yet give adequate flux carrying capacity. In this form a bias coil 28 is illustrated as being on an outer trailing leg 29 with the voice coil 14. As indicated in Figure 5A, the erase coil 12 on the outer leg 30 and bias coil 28 can be wound in such directions relative to each other as to be in aiding flux relation in their magnetic path at the center twisted leg 27. In Figure 5B, the polarity of the bias coil 28 is reversed so as to be in opposing flux relation at the center leg 27 relative to the erase coil 12. Thus, in the same manner as with the embodiment of Figure 1, either a longitudinal or a transverse bias field can be produced in the region of the trailing pole piece 31.

Adjustment of the exact field desired may be made by varying the number of bias turns on the recording side, by reversing connections to the bias coil, or by locating the bias coil on either or both legs of the recording head portion. A preferred adjustment is to have the superimposed cross field at the record gap of the same order of magnitude as or less than the bias field required by the record medium at the record gap. One adjustment which has been successfully used is to make the cross field two-thirds of the bias field at the record gap. A null point in the perpendicular component near the recording gap may be produced by the perpendicular components of the cross field and the bias field when the fields are adjusted in the preferred manner.

It will be noted that the flux lines A produced by the erase coils in Figures 1 and 5 are generally curved so that the field can be adjusted to produce better cancellation and a more nearly complete null point in the perpendicular and parallel components of the resultant flux at the desired point near the recording gap. Furthermore, it will be observed that the field due to the erase coil will progressively diminish in intensity beyond the recording gap so that the desired sharp gradient may be obtained near the gap without excessive field being impressed on the record member after leaving the gap.

More particularly, therefore, the head 26, like the head 10 of Figure 1, may be made from a single core blank, all of which lies on one side only of the record member traveling over the head, and all of which lies in a single plane, except that the upper pole portion 32 of the center leg 27 of the head 26 is twisted through substantially 90° to lie in a plane substantially at right angles to the plane of the remainder of the head. The twisted pole portion 32 thus forms the leading pole piece with respect to the record gap and the pole portion 31 forms the trailing pole piece with respect to the record gap.

Figure 6:
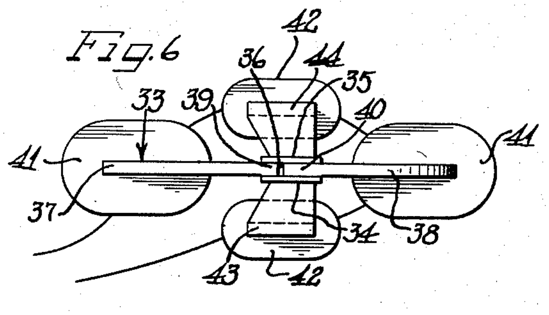
Figure 6 is a top plan view of a further modified form of the present invention utilizing a pair of auxiliary poles.
Figure 8:
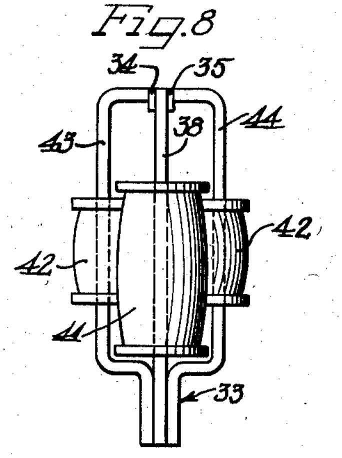
Figure 8 is a side elevational view of the head assembly of Figure 6.
Figure 7:
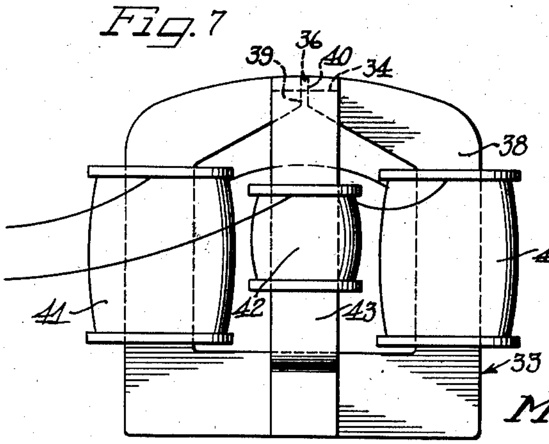
Figure 7 is a front elevational view of the head assembly of Figure 6.

In Figures 6, 7 and 8 of the drawings, I have shown a second modified form of head construction in which a head 33 includes a generally ring-type core and a pair of auxiliary poles 34 and 35 mounted at the sides of a record gap 36 defined by core legs 37 and 38. The legs 37 and 38 have respectively a leading pole portion 39 and a trailing pole portion 40. A pair of signal or voice coils 41 are mounted on the core legs 37 and 38 and a pair of bias coils 42 are mounted on the auxiliary legs 43 and 44.

The voice and bias coils are illustrated as being connected in series and may thus be supplied with both the intelligence signal and the bias voltage. The auxiliary poles may be mounted in alignment with the gap 36; or if it is desired to obtain a longitudinally curving field as illustrated at A in Figure 2 in order to obtain better cancellation, or if it is desired to obtain a more rapidly diminishing field at the trailing pole, the auxiliary poles may be longitudinally spaced from the trailing pole. The auxiliary bias coils 42 are advantageously left connected during reproduction, since an improved pick-up is obtained as well as improved recording.

In the case where both voice and bias voltages are fed to all the coils, the flux diagram of Figure 3 would be applicable to either the voice field or the bias field and to the resultant of the two fields in its general configuration. It will be understood by those skilled in the art, that the head 33 of Figure 7 will give a voice field which is more uniform in the lateral direction when the bias coils 42 also receive the voice voltage.

The head of Figure 7 thus has the feature that both the bias and audio fields are represented by a field similar to Figure 3. The head of Figure 1 produces a modified bias field mainly, which combines improved operation with simple and economical construction.

Figure 9:
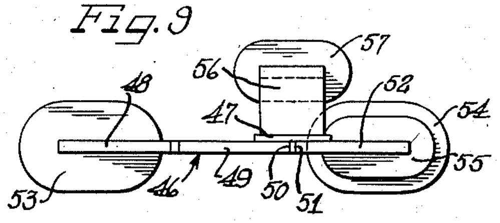
Figure 9 is a top plan view of a still further modified form of the present invention utilizing a single auxiliary pole.
Figure 10:
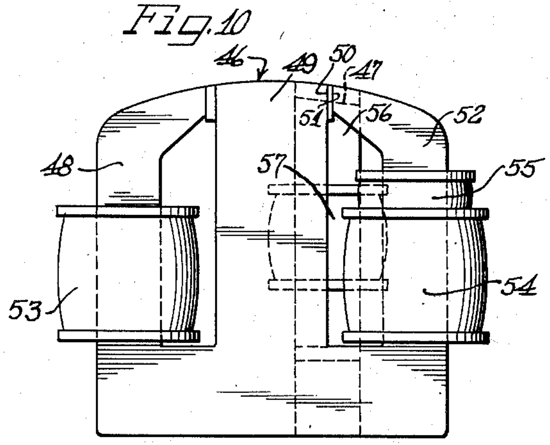
Figure 10 is a front elevational view of the head assembly of Figure 9.
Figure 11:
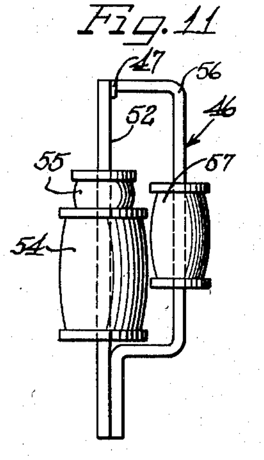
Figure 11 is a side elevational view of the head assembly of Figure 9.

In Figures 9, 10 and 11 of the drawings is illustrated a third modified form of the invention in which a head 46 has only a single auxiliary pole 47. The head may include an erase gap defined by an outer leg 48 and a center leg 49 and a record gap defined by a leading pole portion 50 of the center leg 49 and a trailing pole portion 51 of the other outer leg 52. The spacing of the gaps may be such that the erase coil has no substantial effect on the bias field as with conventional two-gap heads.

In this case an erase coil 53 is mounted on the outer leg 48 and a voice coil 54 and bias coil 55 are illustrated as being mounted on the outer leg 52. The auxiliary leg 56 has an auxiliary coil 57 thereon. The erase coil 53 may be energized separately with the auxiliary coil 57, the voice coil 54 being energized with both bias and voice voltages, and the bias coil 55 not being used, or the erase coil 53, auxiliary coil 57 and bias coil 55 may all be energized from the same high frequency source.

As with the embodiment of Figures 6, 7 and 8, the auxiliary pole 47 may be displaced longitudinally as well as laterally from the trailing pole if desired.

It is to be understood that the present invention is not limited to the recording operation, since a reciprocal relation holds between recording and reproduction, as is usually the case in magnetic recording, and therefore beneficial results of a generally similar nature are obtained by the use of a head according to this invention in play back or reproduction of a signal impressed upon a medium.

The method of the invention disclosed in this application and in my copending application thus includes superimposing on a first alternating magnetic field in and adjacent to a recording region of a head, a second alternating magnetic field of such phase, frequency and magnitude as to oppose the first field adjacent the recording region to substantially reduce the magnetic intensity adjacent the recording region.

In all the embodiments illustrated, the head assembly comprises a pair of poles having pole tips in closely spaced confronting relation, the pole tips being 23, 22 in Figure 1; 32, 31 in Figure 5; 39, 40 in Figure 6; and 50, 51 in Figure 9. An alternating filed is established in the region of the pole tips by the bias coil 13 in Figure 1, the bias coil 28 in Figure 5, the voice coils 41 in Figure 6, and the voice coil 54 or bias coil 55 in Figure 9. A second alternating field is also established in the region of the pole tips, in all the embodiments to change the net intensity and configuration of the field in the region of one of the pole tips as compared with the intensity of the field in the region of the other of the pole tips. The flux distribution illustrated in Figure 3 illustrates such a change in the net intensity and configuration.

The second field is produced in Figure 1 primarily by the erase coil 12 and the relative spacing between the gaps 24 and 25 with respect to the gaps 24 and 25.

In Figures 4 and 5, the second field is similarly produced, the necessary spacing between the gaps being achieved by the twisted center lamination 27 to also give adequate flux carrying capacity.

In Figures 6, 7 and 8, the second field which may include both bias and voice frequencies is produced by the auxiliary coils 42 and the proper spacing of the auxiliary pole portions 34, 35 from the main poles 39, 40 and their proper orientation with respect to the gap 36 along with other conditions which will be apparent to those skilled in the art from the disclosure of this and my copending application, such as the relative magnetomotive forces to be produced by the coils. It will also be apparent to those skilled in the art that the second field lines of flux impinging on the poles 39, 40 may then be similar to the flux lines A in Figure 2 except that the lines will be in generally laterally extending planes at right angles to the plane of the flux lines A in Figure 2. The second flux will, however, interact with the main flux, corresponding to flux B in Figure 2, in an analogous manner as will be understood by those skilled in the art.

In Figures 9, 10 and 11, the erase coil 53 may be on a leg spaced from the record gap relative to the gaps themselves such an amount as not to have a substantial effect on the shape of the bias field in the region of the record gap. The second field is then produced solely by the auxiliary coil 57, the proper spacing and other conditions obtaining.

Furthermore, in all the embodiments illustrated, there is disclosed a ring-type core (legs 19 and 20, Figure 1; legs 27 and 29, Figure 5; legs 37 and 38, Figure 7; and legs 49 and 52, Figure 20) having a pair of closely spaced confronting pole portions separated by a non-magnetic gap across which a magnetic record member is arranged to pass first over a first one of said pole portions and then the gap and then over a second one of said pole portions, a second core in the region of said gap (leg 18, Figure 1; leg 30, Figure 5; legs 43, 44, Figure 7; and leg 56, Figure 10) and spaced from said confronting pole portions and having a third pole portion spaced from said non-magnetic gap and the third pole portion being within the magnetic influence of said first and second pole portions, said ring-type core and said second core having magnetic core elements common to both cores, means for setting up an alternating magnetic flux in said first core thereby to establish an alternating magnetic field in the region of said gap, and means for setting up an alternating magnetic flux in said second core which passes through said third pole portion and at least one of said pole portions of said first core, the first and second core pole portions all lying on one side of said magnetic record member.

The third pole portions in Figures 1 and 5 are spaced longitudinally from the record gap, while in Figures 7 and 9 the third pole portions are spaced laterally from the record gap and pole tips.

It will be understood that modifications and variations may be effected without departing from the scope of the novel concepts of the present invention.

I claim as my invention:

1. An electromagnetic transducer head comprising a core having three legs whose extremities are disposed to define two non-magnetic gaps over which a magnetic record member is arranged to successively pass, means to generate a high frequency M. M. F. in the first leg of said core, means to generate a high frequency M. M. F. in the center leg of said core which is in phase with said first M. M. F. and which means each tend to set up a flux across the first of said gaps in aiding relation to each other, said second means also tending to set up a flux across the second of said gaps, and means on said third leg to generate an alternating M. M. F. as a function of the signal to be recorded.

2. An electromagnetic transducer head comprising a core having a center leg and two outer legs, said legs having extremities in proximity to each other and positioned to form two non-magnetic gaps, said legs being positioned to have a magnetic record member pass first over the pole extremity of one of said outer legs, then over a first gap, then over the extremity of said center leg, then over the second of said gaps and then over the extremity of the other of said outer legs, an erase coil on said first outer leg, a high frequency bias coil on said center leg, and a signal coil on said second outer leg, said high frequency bias coil being energized in phase and in flux aiding relation with said erase coil.

3. An electromagnetic transducer head comprising a core having a center leg and two outer legs, said legs having extremities in proximity to each other and positioned to form two non-magnetic gaps, said legs being positioned to have a magnetic record member pass first over the pole extremity of one of said outer legs, then over a first gap, then over the extremity of said center leg, then over the second of said gaps and then over the extremity of the other of said outer legs, an erase coil on said first outer leg, a high frequency bias coil on said center leg, and a signal coil on said second outer leg, said high frequency bias coil being serially connected to said erase coil and wound in a flux aiding direction with respect to said erase coil.

4. An electromagnetic transducer head comprising a core having a center leg and two outer legs, said legs having extremities in proximity to each other and positioned to form two non-magnetic gaps, said legs being positioned to have a magnetic record member pass first over the pole extremity of one of said outer legs, then over a first gap, then over the extremity of said center leg, then over the second of said gaps and then over the extremity of the other of said outer legs, an erase coil on said first outer leg, a high frequency bias coil on said center leg, and a signal coil on said second outer leg, said high frequency bias coil being energized in phase and in flux aiding relation with said erase coil, said gaps being positioned sufficiently close together so that a substantial amount of leakage flux from said first gap extends over into the region of said second gap, whereby the vertical components of high frequency flux at the leading edge of said second gap are additive and the vertical components of high frequency flux at the trailing edge of said second gap are in opposition.

5. An electromagnetic transducer head having three pole portions and a pair of closely spaced non-magnetic gaps therebetween, one of said gaps being an erase gap and the other of said gaps being a record gap, means for establishing an alternating magnetic flux in the region of said record gap whose frequency and amplitude varies as a function of the signal to be recorded, means for establishing a high frequency alternating flux in the region of said record gap whose general direction of orientation at the leading edge of said record gap is substantially at right angles to the direction of travel of a record member and whose general direction of orientation is parallel to the direction of travel of said record member at the trailing edge of said record gap.

6. An electromagnetic head comprising a pair of poles having pole tips in closely spaced confronting relation and arranged to have a magnetic record member pass thereacross from one pole to the other, means for establishing an alternating magnetic field in the region of said pole tips, and means for establishing a second alternating magnetic field in the region of said pole tips to change appreciably the net intensity and configuration of said field in the region of one of said pole tips as compared with the intensity of said field in the region of the other of said pole tips, said head being adapted to lie entirely on one side of the record member passing thereacross.

7. The electromagnetic head of claim 6 where one of said poles is twisted to extend generally laterally of the head to allow closer spacing of said last mentioned pole in its entirety to the other pole while affording adequate flux carrying capacity.

8. The electromagnetic head of claim 6 wherein said secondary field establishing means includes a third pole spaced laterally from said pole tips.

9. The electromagnetic head of claim 6 wherein said secondary field establishing means includes a third pole spaced longitudinally from said pole tips.

10. An electromagnetic transducer comprising a ring-type core having a pair of closely spaced confronting pole portions separated by a non-magnetic gap across which a magnetic record member is arranged to pass first over the first one of said pole portions and then the gap and finally over a second one of said pole portions, a second core in the region of said gap and spaced from said confronting pole portions and having a third pole portion spaced from said non-magnetic gap, said first and second pole portions being within the magnetic influence of said third pole portion, said ring type core and said second core having magnetic core elements common to both cores, means for setting up an alternating magnetic flux in said first core thereby to establish an alternating magnetic field in the region of said gap, and means for setting up an alternating magnetic flux in said second core having a leakage flux which passes through said third pole portion and at least one of said pole portions of said first core and is of magnitude comparable to the magnitude of the flux in said first core in the region of said gap, the three pole portions all being adapted to lie on one side of the magnetic record member.

11. The transducer of claim 10 wherein one of the confronting pole portions is twisted to extend generally laterally of the head to allow closer spacing of said last mentioned pole portion in its entirety to the other pole portion while affording adequate flux carrying capacity.

12. The transducer of claim 10 wherein the third pole portion is spaced laterally from said non-magnetic gap.

13. The transducer of claim 10 wherein the third pole portion is spaced longitudinally from said non-magnetic gap.

14. An electromagnetic transducer head comprising a magnetic core having a pair of non-magnetic gaps therein over which a magnetic record member is arranged to pass successively, means for establishing a high frequency magnetic field across the first of said gaps, means energized by the signal to be recorded for establishing a magnetic field across the second of said gaps, said high frequency field being sufficiently strong to extend over in air into the region of said second gap and modify in a substantial manner the field shape of said signal field, said core including a twisted center leg between the pair of gaps.

15. An electromagnetic transducer head comprising a core having three legs whose extremities are disposed to define two non-magnetic gaps over which a magnetic record member is arranged to successively pass, means to generate a high frequency M. M. F. in the first leg of said core, means to generate a high frequency M. M. F. in the other two legs of said core which is in phase with said first M. M. F. and which means each tend to set up a flux across the first of said gaps in aiding relation to each other, said second means also tending to set up a flux across the second of said gaps, and means on said third leg to generate an alternating M. M. F. as a function of the signal to be recorded, the center leg being twisted to provide a generally laterally extending pole portion between the two gaps for close spacing of the gaps and adequate flux carrying capacity in the center leg.

16. An electromagnetic transducer head comprising a core having three legs whose extremities are disposed to define two non-magnetic gaps over which a magnetic record member is arranged to successively pass, means to generate a high frequency M. M. F. in the first leg of said core, means to generate a high frequency M. M. F. in the other two legs of said core and a further pole portion spaced laterally from said gap over which the record member is to pass second.

17. In an electromagnetic head, first means including first and second poles for establishing a first magnetic field therebetween in a region adjacent said first and second poles for interaction with a record medium in said region, and second means including a third pole for establishing a second magnetic field in said region of magnitude comparable to the magnitude of said first magnetic field in said region, said first, second and third poles all lying on the same side of said region.

18. In an electromagnetic head, first means including first and second poles for establishing a first magnetic field, second means including third and fourth poles for establishing a second magnetic field, means defining a path of travel for a record medium successively through said first and second fields with said first, second, third and fourth poles all lying on the same side of said path, and said first means being operative to establish a magnetic field extending in air from one of said first and second poles to one of said third and fourth poles and into a region where the path of said record medium intersects said second magnetic field and of magnitude in said region comparable to the magnitude of said second field to appreciably affect said record medium in said region.

19. In an electromagnetic transducer head, a core having a gap therein, first means adapted to act on said core for establishing a first magnetic field in the region of the gap, and a second means for establishing an auxiliary magnetic field of the same order of magnitude as the first field at the gap, said core being adapted to lie entirely on one side of the record member travelling across said gap.

20. In an electromagnetic transducer head, core means having a gap therein, first means adapted to act on said core means for establishing a first magnetic field in the region of the gap, and second means adapted to act on said core means for establishing an auxiliary magnetic field somewhat less than the first field at the gap, said core means being adapted to lie entirely on one side of the record member passing across said gap.

21. An electromagnetic transducer head comprising a magnetic core having a pair of non-magnetic gaps therein over which a magnetic record member is arranged to pass successively, means for establishing a magnetic erase field across the first of the gaps, means for establishing a bias field across the second of said gaps, means whereby said erase field establishing means is operative to produce a magnetic field extending over in air into the region of said second gap of magnitude in the region of said second gap of the order of said bias field in the region of said second gap.

22. An electromagnetic transducer head comprising a magnetic core having a pair of non-magnetic gaps therein over which a magnetic record member is arranged to pass successively, means for establishing a magnetic erase field across the first of said gaps, means for establishing a magnetic bias field across the second of said gaps, means whereby said erase field establishing means is operative to produce a magnetic field extending over in air into the region of said second gap of the order of two-thirds of the magnitude of the bias field in the region of said second gap to modify in a substantial manner the field shape of said bias field.

23. An electromagnetic transducer head comprising a magnetic core having a pair of non-magnetic gaps therein over which a magnetic record member is arranged to pass successively, means for establishing a first magnetic field across the first of said gaps, means for establishing a second magnetic field across the second of said gaps, means whereby said first field establishing means is operative to produce a magnetic field extending over in air into the region of said second gap and establishing an effective null point in the region of said second gap.

24. An electromagnetic transducer head comprising a magnetic core having a pair of non-magnetic gaps therein over which a magnetic record member is arranged to pass successively, means for establishing a first magnetic field across the first of said gaps, means for establishing a second field across the second of said gaps, means whereby said first field establishing means is operative to produce a magnetic field extending over in air into the region of said second gap and having a magnitude in the neighborhood of two-thirds of the second field in the region of the second gap to modify in a substantial manner the field shape of said second field.

25. An electromagnetic transducer head comprising a magnetic core having a pair of closely spaced non-magnetic gaps therein over which a magnetic record member is arranged to pass successively, first means for causing a first magnetic flux to flow in a portion of said core and across the first of said gaps, second means for establishing a second magnetic flux in a second portion of said core and across the second of said gaps, and means comprising the close spacing of said gaps and said first means for causing said first magnetic flux extend over in air into the region of said second gap and to be of a magnitude in the neighborhood of two-thirds of the second flux in the region of said second gap.

26. An electromagnetic transducer head comprising a magnetic core having a pair of closely spaced non-magnetic gaps therein over which a magnetic record member is arranged to pass, first means for establishing a high frequency magnetic flux in a portion of said core and across the first of said gaps, second means for establishing an alternating bias flux to flow in a second portion of said core and across the second of said gaps, and means comprising the close spacing of said gaps and said first means for establishing a high frequency magnetic flux which extends over in air into the region of said second gap and has a magnitude in the region of said second gap approximating the magnitude of said bias field in region of said second gap.

27. An electromagnetic transducer head comprising a magnetic core having a pair of closely spaced non-magnetic gaps therein over which a magnetic record member is arranged to pass successively, means for establishing a first magnetic field across the first of said gaps, means for establishing a second magnetic field across the second of said gaps, said non-magnetic gaps being spaced a distance of the order of five times the width of said first gap, and means whereby said first magnetic field establishing means is operative to establish a magnetic flux which extends over in air into the region of said second gap and modifies in a substantial manner the field shape of said second field.

28. An electromagnetic transducer head comprising a magnetic core having a pair of closely spaced non-magnetic gaps therein, means for establishing a first magnetic field across the first of said gaps, means for establishing a second magnetic field across the second of said gaps, the spacing between said non-magnetic gaps being not greater than five times the width of said first gap, and means whereby said first magnetic field establishing means is operative to establish a magnetic field which extends over in air into the region of said second gap and modifies in a substantial manner the field shape of said second field.

29. An electromagnetic transducer head comprising a magnetic core having first and second poles defining a first non-magnetic gap, over which a magnetic record member is arranged to pass, means for producing a high frequency M. M. F. across said first gap, a third pole on the same side of said record member as said first and second poles and spaced therefrom, means completing a magnetic circuit between said second pole and said third pole, and means for producing a high frequency M. M. F. between said second pole and said third pole to set up a high frequency field between said second and third poles having a magnitude in the region of said gap approximating the magnitude of the high frequency M. M. F. across said gap.

30. An electromagnetic transducer head comprising a magnetic core having first and second poles defining a first non-magnetic gap over which a magnetic record member is arranged to pass, means for producing a high frequency M. M. F. across said first gap, a third pole on the same side of said record member as said first and second poles and spaced therefrom, means completing a magnetic circuit between said second pole and said third pole, means for producing a high frequency M. M. F. between said second pole and said third pole to set up a high frequency field between said second and third poles having a magnitude in the region of said gap approximating the magnitude of the high frequency M. M. F. across said gap, and a record member travelling successively over said third pole, said first pole and then said second pole.

31. An electromagnetic transducer head comprising a magnetic core having first and second poles defining a first non-magnetic gap over which a magnetic record member is arranged to pass, means for producing a high frequency M. M. F. across said first gap, a third pole on the same side of said record member as said first and second poles and spaced therefrom, means completing a magnetic circuit between said second pole and said third pole, and means for producing a high frequency M. M. F. between said second pole and said third pole to set up a high frequency field between said second and third poles having a magnitude in the region of said gap approximating the magnitude of the high frequency M. M. F. across said gap, said third pole being spaced laterally from the path of travel of a record member over said first and second poles.

32. An electromagnetic head comprising a pair of poles having pole tips in closely spaced relation and arranged to have a magnetic record member passed thereacross from one pole to another, means for establishing an alternating magnetic field in the region of said pole tips, and means for establishing a second alternating magnetic field in the region of said pole tips of magnitude approximating the magnitude of said first mentioned alternating magnetic field in the region of said pole tips to change appreciably the net intensity and configuration of said field in the region of one of said pole tips as compared with the intensity of said field in the region of the other of said pole tips, said head being constructed to receive said record member and to provide an unobstructed area on one side of said record member for ease in threading of the record member into operative relation to the head.

33. An electromagnetic head comprising a pair of poles having pole tips in closely spaced confronting relation and arranged to have a magnetic record member pass thereacross from one pole to another, means for establishing a first alternating magnetic field in the region of said pole tips, and means for establishing a second alternating magnetic field in the region of said pole tips of magnitude and phase to produce an effective null point in the region of one of said pole tips, said head being adapted to lie entirely on one side of the record member passing thereacross.

34. A magnetic head comprising a magnetic core having a pair of closely spaced non-magnetic gaps therein, first means for producing a first high frequency M. M. F. across the first of said gaps thereby to set up a concentrated high frequency flux across and in the region of said first gap, second means for producing a second high frequency M. M. F. across the second of said gaps to set up a concentrated high frequency flux across and in the region of said second gap, and means comprising the size and position of said gaps and said first means for causing a portion of the high frequency magnetic flux produced by the said first means to extend into the region of said second gap and to be of magnitude relative to the flux in the region of said second gap set up by the M. M. F. across said second gap to produce a resultant flux in the region of said second gap through which said record member passes in which the flux lines are substantially at right angles to the direction of travel of the record member on one side of said second gap and are generally parallel to the direction of travel of the record member on the opposite side of said second gap.

35. An electromagnetic transducer head comprising a magnetic core having a pair of closely spaced non-magnetic gaps therein over which a magnetic record member is arranged to pass successively, first means for causing a first high frequency magnetic flux to flow in a portion of said core and across the first of said gaps, second means for causing a second high frequency magnetic flux to flow in a second portion of said core and across the second of said gaps, means including the close spacing of said gaps and said first means for causing high frequency leakage flux from said first gap extend over in air into the region of said second gap and have a substantial magnitude relative to said second high frequency flux in the region of said second gap to modify in a substantial manner said second high frequency magnetic flux in the region of said second gap.

36. An electromagnetic transducer head comprising a magnetic core having a pair of closely spaced non-magnetic gaps therein over which a magnetic record member is arranged to pass successively, means for causing a high frequency magnetic flux to flow in a portion of said core and across first of said gaps, means for causing a high frequency flux to flow in another portion of said core and across the second of said gaps, means for establishing an alternating magnetic flux representing the signal to be recorded in said second portion of said core and across said second of said gaps, and means comprising the close spacing of said gaps and the size of said first gap causing leakage flux from said first gap extend over into the region of said second gap, said first and second means producing magnetic fluxes having a phase relation therebetween such that the components of said first and second fluxes at one edge of said second gap are generally at right angles to the direction of travel of said record member and are additive and the components of said first and second fluxes at the other edge of said gap are generally at right angles to the direction of travel of the record member and are opposed to each other, said first and second means producing magnetic fluxes of relative magnitudes such that said first and second fluxes at said second gap produce a resultant flux pattern in the region of said second gap in which the flux lines are substantially at right angles to the direction of travel of the record member at one edge of said gap and are generally parallel to the direction of travel of the record member on the opposite edge of the gap.

37. An electromagnetic transducer comprising first core means having a pair of closely spaced pole portions separated by a non-magnetic gap, a record medium travelling over a first of said pole portions, then over the gap, and finally over a second of said pole portions with the gap recording a longitudinal trace along the record member, and second core means having a third pole portion spaced from said non-magnetic gap in a direction transverse to the direction of movement of the record member thereacross, said third pole portion being offset laterally from the trace recorded on said record member by said gap and being disposed at one side of said gap.

38. An electromagnetic transducer comprising a first core having a pair of closely spaced pole portions separated by a non-magnetic gap across which a record member is arranged to pass first over a first one of said pole portions and then the gap and finally over a second one of said pole portions, and a second core forming a magnetic circuit with portions of said first core and having a third pole portion disposed to engage a portion of the record member laterally spaced from the portion of the record member travelling across said gap, said third pole portion lying generally in the plane of said first and second pole portions and laterally spaced therefrom.

39. An electromagnetic head comprising a pair of poles having pole portions in closely spaced relation and arranged to have a magnetic record member pass thereacross from one pole to the other, means for establishing a first magnetic field in the region of said pole portions, and means for establishing a second magnetic field in the region of said pole portions to change appreciably the net intensity and configuration of said first field in the region of one of said pole portions as compared with the intensity of said first field in the region of the other of said pole portions, said head being adapted to lie entirely on one side of the record member passing thereacross.

40. An electromagnetic transducer head comprising a core having three legs disposed to define two non-magnetic gaps over which a magnetic record member is arranged to successively pass, means to generate a first M. M. F. in the first leg of said core, means to generate a second M. M. F. in the center leg of said core which is in phase with said first M. M. F. and which means each tend to set up a flux across the first of said gaps in aiding relation to each other, said second means also tending to set up a flux across the second of said gaps, and means on said third leg to generate an M. M. F. as a function of the signal to be recorded.

References Cited in the file of this patent

UNITED STATES PATENTS

| | | |
|---|---|---|
| 2,418,542 | Camras | Apr. 8, 1947 |
| 2,620,403 | Howey | Dec. 2, 1952 |
| 2,628,285 | Camras | Feb. 10, 1953 |
| 2,633,504 | Beer | Mar. 31, 1953 |
| 2,675,429 | Rholing | Apr. 13, 1954 |